(12) United States Patent
Harrigan, Sr. et al.

(10) Patent No.: US 6,311,741 B1
(45) Date of Patent: Nov. 6, 2001

(54) FUEL TANK FUEL VAPOR EMISSION CONTROL THROUGH AIR INGESTION REDUCTION

(75) Inventors: Michael Joseph Harrigan, Sr., Ann Arbor; Robert H. Thompson, Redford, both of MI (US)

(73) Assignee: Ford Global Technologies, Inc, Dearborn, MI (US)

( * ) Notice: Subject to any disclaimer, the term of this patent is extended or adjusted under 35 U.S.C. 154(b) by 0 days.

(21) Appl. No.: 09/538,368

(22) Filed: Mar. 29, 2000

(51) Int. Cl.[7] .............................. B65B 1/30; B65B 3/28; B65B 57/06; B65B 57/14; B67C 3/00
(52) U.S. Cl. .................. 141/198; 141/4; 141/8; 141/287; 141/291; 141/301; 141/351
(58) Field of Search .............................. 141/4, 8, 44, 47, 141/50, 59, 65, 66, 198, 285, 287, 291, 301, 302, 312, 346–349, 351, 352, 354; 220/86.1, 86.2, 86.3, DIG. 33; 137/289, 587

(56) References Cited

U.S. PATENT DOCUMENTS

| 4,836,835 | 6/1989 | Harris et al. . |
| 4,881,578 | * 11/1989 | Rich et al. ............................ 141/44 |
| 4,898,395 | 2/1990 | Kawase . |
| 4,944,779 | 7/1990 | Szlaga et al. . |
| 4,977,936 | 12/1990 | Thompson et al. . |
| 5,056,570 | 10/1991 | Harris et al. . |
| 5,271,438 | * 12/1993 | Griffen et al. ........................ 141/59 |
| 5,404,906 | 4/1995 | Aoshima et al. . |
| 5,462,100 | 10/1995 | Covert et al. . |

* cited by examiner

Primary Examiner—Timothy L. Maust
(74) Attorney, Agent, or Firm—Jerome Drouillard

(57) ABSTRACT

A fuel tank filler pipe neck assembly, a fuel tank system and a method for refueling a fuel tank each employ a chamber having formed therein a liquid fuel dispensing nozzle entry port and a liquid fuel exit port. There is also disposed within the chamber a liquid fuel dispensing nozzle seat, where the liquid fuel dispensing nozzle seat is sized to accept and seal a rim of a liquid fuel dispensing nozzle introduced into the liquid fuel dispensing nozzle entry port while allowing flow of a liquid fuel from the liquid fuel dispensing nozzle through the liquid fuel dispensing nozzle seat. Finally, there is also disposed within the chamber a means for resiliently and flexibly biasing the liquid fuel dispensing nozzle seat against the rim of the liquid fuel dispensing nozzle while resiliently and flexibly sealing the liquid fuel dispensing nozzle seat to the liquid fuel exit port. The fuel tank filler pipe neck assembly, the fuel tank system and the method for refueling the fuel tank each provide for attenuated fuel vapor formation when refueling the fuel tank.

16 Claims, 2 Drawing Sheets

FUEL TANK FUEL VAPOR EMISSION CONTROL THROUGH AIR INGESTION REDUCTION

BACKGROUND OF THE INVENTION

1. Field of the Invention

The present invention relates generally to fuel vapor emission control for internal combustion engines. More particularly, the present invention relates to fuel tank fuel vapor emission control for internal combustion engines.

2. Description of the Related Art

Modern transportation vehicles which employ a liquid fuel conventionally also employ for storage of the liquid fuel a fuel tank. Similarly, since most liquid fuels are highly volatile, such a fuel tank typically contains in addition to the liquid fuel a fuel vapor. A concentration of fuel in the fuel vapor within the fuel tank is generally related to the temperature of the liquid fuel within the fuel tank, the amount of air in ullage volume, and the temperature of the fuel vapor within the fuel tank.

While a fuel vapor within a fuel tank does not typically impair operation of a transportation vehicle which is powered by an engine which employs a liquid fuel extracted from the fuel tank, upon refueling of the fuel tank with additional liquid fuel, in a first instance, the fuel vapor present in the fuel tank must of necessity be displaced. Similarly, in a second instance, when refueling the fuel tank with additional liquid fuel there is typically also newly generated additional fuel vapor incident to splashing of the additional liquid fuel which is introduced into the fuel tank. For environmental protection purposes and for economic reasons, it is desirable for such displaced fuel vapor and newly generated fuel vapor not to be released into the atmosphere.

Various apparatus, systems and methods have been disclosed within the art of fuel system design for attenuating, upon refueling of a fuel tank, release of a fuel vapor into the atmosphere. Typical in that regard are apparatus, systems and methods which employ either or both: (1) valving schemes to redirect displaced fuel vapors and newly generated fuel vapors in a fashion such as to avoid release into the environment; and (2) sealing means to attenuate, in a first instance, generation of fuel vapors. Representative examples of such apparatus, systems and methods are disclosed within U.S. Pat. No. 4,836,835, U.S. Pat. No. 4,898,395, U.S. Pat. No. 4,944,779, U.S. Pat. No. 4,977,936, U.S. Pat. No. 5,056,570, U.S. Pat. No. 5,404,906 and U.S. Pat. No. 5,462,100, all of which are incorporated herein fully by reference.

While any of the foregoing apparatus, systems and methods provides upon refueling of a fuel tank with a liquid fuel an attenuated displaced fuel vapor release into the atmosphere and/or an attenuated newly generated fuel vapor release into the atmosphere, such desirable result is often achieved only with particularly complicated piping and valving schemes, or with an otherwise incomplete attenuation of fuel vapor release into the atmosphere.

There thus exists within the art of fuel system design a continuing need for comparatively simple apparatus, systems and methods for more completely attenuating upon refueling of a fuel tank release of a fuel vapor into the atmosphere.

It is towards that object that the present invention is directed.

SUMMARY OF THE INVENTION

In order to realize the object towards which the present invention is directed, the present invention provides, in a first instance, a fuel tank filler pipe neck assembly comprising: (1) a chamber having formed therein a liquid fuel dispensing nozzle entry port and a liquid fuel exit port; (2) a liquid fuel dispensing nozzle seat disposed within the chamber, where the liquid fuel dispensing nozzle seat is sized to accept and seal a rim of a liquid fuel dispensing nozzle introduced into the liquid fuel dispensing nozzle entry port while allowing flow of a liquid fuel dispensed from the liquid fuel dispensing nozzle through the liquid fuel dispensing nozzle seat; and (3) a means for resiliently and flexibly biasing the liquid fuel dispensing nozzle seat against the rim of the liquid fuel dispensing nozzle while resiliently and flexibly sealing the liquid fuel dispensing nozzle seat to the liquid fuel exit port.

By: (1) employing within the present invention the chamber having disposed therein the liquid fuel dispensing nozzle seat and the means for resiliently and flexibly biasing the liquid fuel dispensing nozzle seat against a rim of a liquid fuel dispensing nozzle introduced into the chamber; and (2) when properly seating the rim of the liquid fuel dispensing nozzle upon the liquid fuel dispensing nozzle seat in the process of introducing liquid fuel into a fuel tank to which is connected the fuel tank filler pipe neck assembly of the present invention, there is avoided within the context of the present invention entrainment into the liquid fuel which is introduced into the fuel tank air which would otherwise provide for formation of fuel vapor within the fuel tank.

Similarly, since within the present invention the seating of a rim of a liquid fuel dispensing nozzle against the liquid fuel dispensing nozzle seat in part seals a flow of a liquid fuel from the liquid fuel dispensing nozzle with respect to a liquid fuel exit port within the fuel tank filler pipe neck assembly of the present invention, and since the present invention thus eliminates a splashing of the liquid fuel in the vicinity of a vacuum sensing port incorporated into the liquid fuel dispensing nozzle, the preferred embodiments of the present invention also provide an alternative means for shutting down the liquid fuel dispensing nozzle by means of inducing vacuum with respect to the vacuum sensing port of the liquid fuel dispensing nozzle.

BRIEF DESCRIPTION OF THE DRAWINGS

The objects, features and advantages of the present invention are understood within the context of the Description of the Preferred Embodiments, as set forth below. The Description of the Preferred Embodiments is understood within the context of the accompanying drawings, which form a material part of this disclosure, wherein.

DESCRIPTION OF THE PREFERRED EMBODIMENTS

Figure 1:
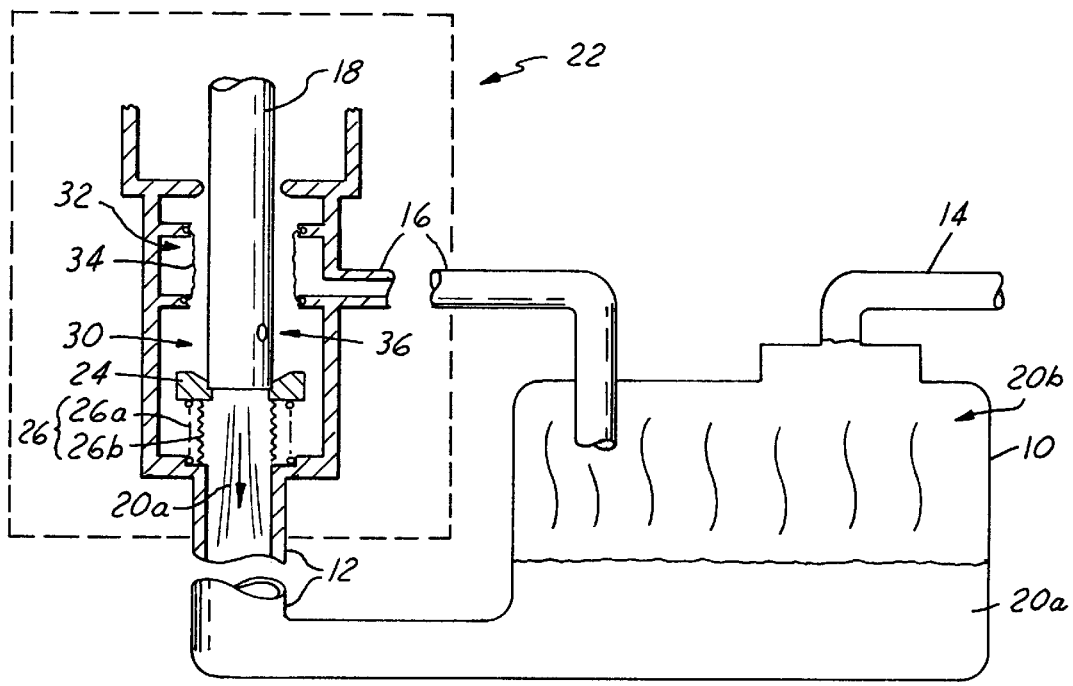
FIG. 1 and FIG. 2 show a pair of schematic diagrams illustrating operation of a fuel tank filler pipe neck assembly within a fuel system in accord with a first preferred embodiment of the present invention.
Figure 2:
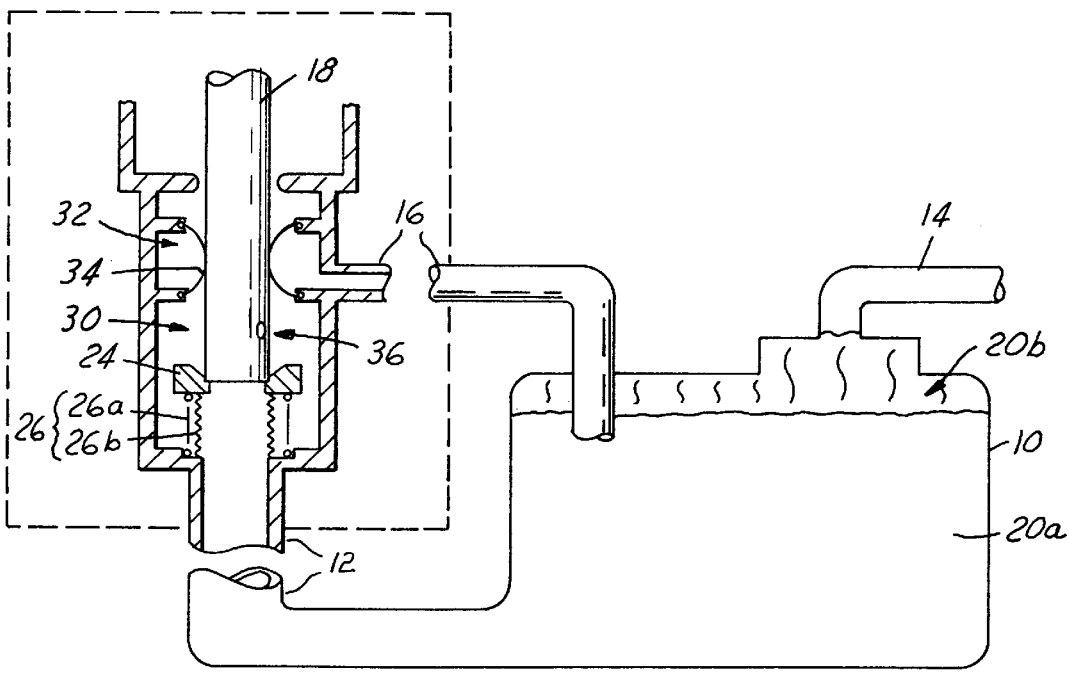

Referring now to FIG. 1 and FIG. 2, there is shown a pair of schematic diagrams illustrating operation of a fuel tank filler pipe neck assembly within a fuel system in accord with a first preferred embodiment of the present invention. Shown in FIG. 1 is a schematic diagram of the fuel system at an earlier point in operation of the fuel tank filler pipe neck assembly.

Shown in FIG. 1 is a fuel tank 10 having incorporated therein a fuel tank filler pipe 12 which is employed for introducing a liquid fuel 20a into the fuel tank 10. Within the fuel tank 10, the liquid fuel 20a has formed thereover a fuel vapor 20b. At a distal end of the fuel tank filler pipe 12 with respect to the fuel tank 10 there is illustrated a fuel tank filler pipe neck assembly 22. There is also shown within the schematic diagram of FIG. 1 further with respect to the fuel tank 10: (1) a fuel tank fuel vapor vent pipe 14 which vents the fuel vapor 20b from the fuel tank 10 when refueling the fuel tank 10 with the liquid fuel 20a; and (2) a fuel tank fuel level sensor 16 which is similarly further in fluid communication with the fuel tank filler pipe neck assembly 22.

Within the first preferred embodiment of the present invention with respect to the fuel tank level sensor 16, and as illustrated within the schematic diagram of FIG. 1, the fuel tank level sensor 16 comprises a hollow member, such as but not limited to a tube, one end of which penetrates into the fuel tank 10 and the other end of which terminates within the fuel tank filler pipe neck assembly 22. Operation of the fuel tank level sensor 16 is discussed in greater detail below.

Within the first preferred embodiment of the present invention with respect to the fuel tank filler pipe neck assembly 22, the fuel tank filler pipe neck assembly 22 comprises in a first instance a first chamber 30 having formed therein a liquid fuel dispensing nozzle entry port (illustrated by implication) through which is introduced a liquid fuel dispensing nozzle 18 and a liquid fuel exit port (also illustrated by implication) through which exits the liquid fuel 20a which is dispensed by the liquid fuel dispensing nozzle 18. Similarly, with respect to the fuel tank filler pipe neck assembly 22 and contained within the first chamber 30 is a liquid fuel dispensing nozzle seat 24 upon which is seated and sealed a rim of the liquid fuel dispensing nozzle 18 while dispensing the liquid fuel 20a therefrom, and while allowing the liquid fuel 20a to pass through the liquid fuel dispensing nozzle seat 24. Similarly, there is also shown within the schematic diagram of FIG. 1 with respect to the first chamber 30 and the liquid fuel dispensing nozzle seat 24 a resilient and flexibly biased sealing means 26 further sealing the liquid fuel dispensing nozzle seat 24 with respect to the liquid fuel exit port of the first chamber 30.

Within the first preferred embodiment of the present invention with respect to the resilient and flexibly biased sealing means 26, although the schematic diagram of FIG. 1 illustrates the resilient and flexibly biased sealing means 26 as nominally formed of a spring 26a surrounding a flexible curtain 26b typically and preferably formed of a liquid fuel 20a impervious material, other resilient and flexibly biased sealing means may be employed when fabricating the resilient and flexibly biased sealing means 26. In that regard, for example and without limitation, the resilient and flexibly biased sealing means 26 may also be formed as a laminated construction which incorporates both a resilient bias means and a flexible sealing means into a single component. Similarly, and also for example and without limitation, within the present invention and the first preferred embodiment of the present invention the flexible curtain 26b may be formed surrounding the spring 26a. Important to the present invention is that the resilient and flexibly biased sealing means 26 actually be resilient (i.e., elastic) and flexible (i.e., able to be deformed in multiple directions) such as to accommodate variations of seating of the liquid fuel dispensing nozzle 18 with respect to the liquid fuel dispensing nozzle seat 24. Finally, although the preferred embodiment of the present invention also illustrates the liquid fuel dispensing nozzle seat 24 and the resilient and flexibly biased sealing means 26 as separate components, they too may also be fabricated as a single integral component.

As is illustrated within the schematic diagram of FIG. 1, since the liquid fuel dispensing nozzle seat 24 and the resilient and flexibly biased sealing means 26 effectively seal a flow of liquid fuel 20a from the liquid fuel dispensing nozzle 18 when dispensing the liquid fuel 20a from the liquid fuel dispensing nozzle 18 into the fuel tank filler pipe 12, within the context of the present invention and the first preferred embodiment of the present invention there is no adventitious air or fuel vapor entrained into the liquid fuel 20a dispensed from the liquid fuel dispensing nozzle 18 and thus there is minimized formation of additional fuel vapor 20b within either the fuel tank 10 or the first chamber 30 when dispensing liquid fuel 20a from the liquid fuel dispensing nozzle 18.

However, and also within the context of the present invention and the first preferred embodiment of the present invention, since the liquid fuel dispensing nozzle 18 is effectively seated against the liquid fuel dispensing nozzle seat 24 and sealed with respect to the liquid fuel exit port of the first chamber 30, there is also absent within the present invention and the first preferred embodiment of the present invention a splashing of the liquid fuel 20a against a vacuum sensing port 36 of the liquid fuel dispensing nozzle 18, which splashing would otherwise trigger a shut down of the liquid fuel dispensing nozzle 18 when the fuel tank 10 is filled with liquid fuel 20a.

Thus, in order to effectively shut down the liquid fuel dispensing nozzle 18 when the liquid fuel 20a within the fuel tank 10 reaches an appropriately high level, the fuel tank filler pipe neck assembly 22 of the present invention employs an alternative means which is not predicated upon a splashing of liquid fuel 20a against the vacuum sensing port 36 of the liquid fuel dispensing nozzle 18. Within the context of the first preferred embodiment of the present invention, the alternative means comprises a second chamber 32 annular to the liquid fuel dispensing nozzle 18 and further in fluid communication with the fuel tank fuel level sensor 16. As is illustrated within the schematic diagram of FIG. 1, the second chamber 32 is enclosed with an unbiased annular sealing means 34 (i.e., illustrated specifically as a diaphragm) which may be formed of a flexible sealing material analogous or equivalent to the flexible sealing material from which is formed the flexible curtain 26b. The unbiased annular sealing means 34 when unbiased as illustrated within the schematic diagram of FIG. 1 allows entry of air, gas or vapor (i.e., an uncondensed make-up fluid) into the first chamber 30 such that the vacuum sensing port 36 of the liquid fuel dispensing nozzle 18 experiences no vacuum and thus liquid fuel 20a is continuously dispensed from the liquid fuel dispensing nozzle 18.

As is further illustrated within the schematic diagram of FIG. 2, under circumstances when the fuel tank 10 is sufficiently filled with the liquid fuel 20a such that the liquid fuel 20a covers the fuel tank fuel level sensor 16, there is provided a pressure head to a volume of gas or vapor within the second chamber 32 such that the unbiased annular sealing means 34 as illustrated in FIG. 1 is pressure biased to form the pressure biased annular sealing means 34' which effectively annularly seals the liquid fuel dispensing nozzle 18 within the first chamber 30 such that the vacuum sensing port 36 of the liquid fuel dispensing nozzle 18 senses a vacuum which shuts down the liquid fuel dispensing nozzle 18.

Figure 3:
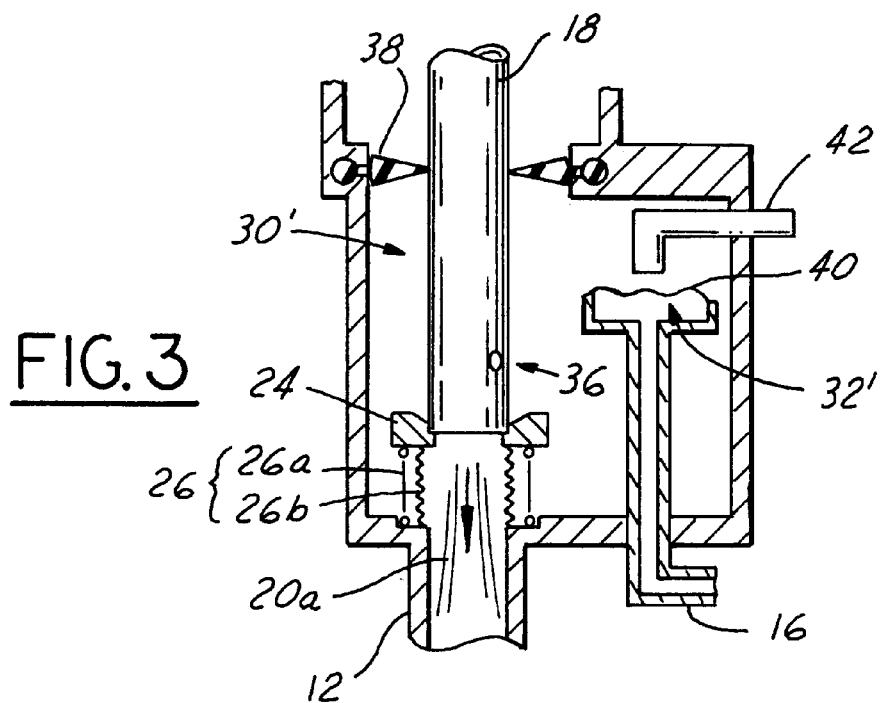
FIG. 3 and FIG. 4 show a pair of schematic diagrams illustrating operation of a fuel tank filler pipe neck assembly in accord with a second preferred embodiment of the present invention.
Figure 4:
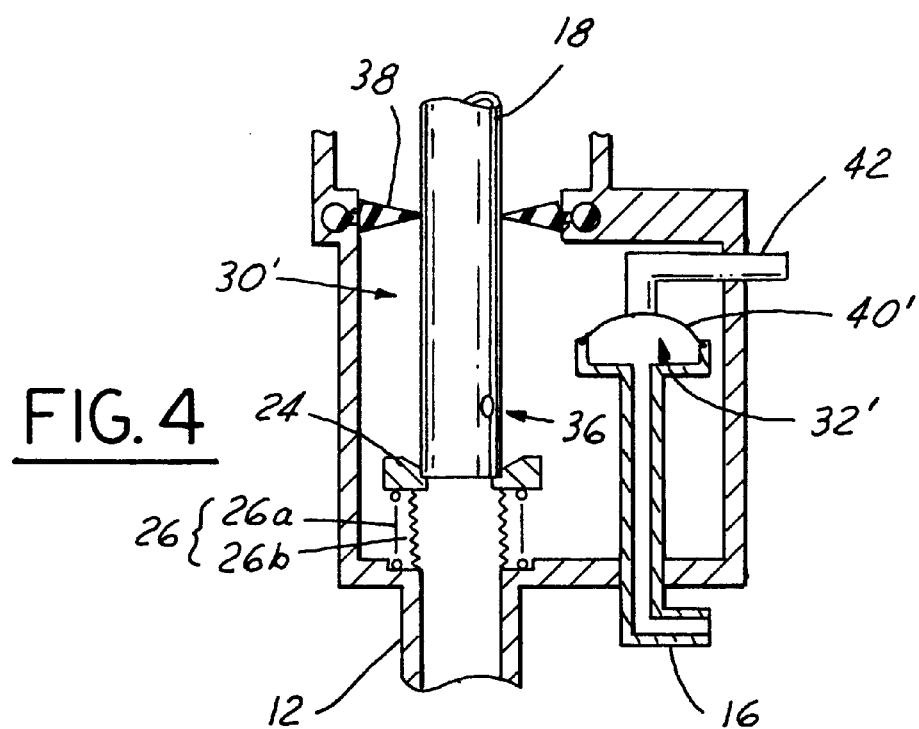

Referring now to FIG. 3 and FIG. 4, there is shown a pair of schematic diagrams illustrating operation of a fuel tank filler pipe neck assembly in accord with a second preferred embodiment of the present invention. Shown in FIG. 3 is a schematic diagram of the fuel tank filler pipe neck assembly at an early stage in its operation in accord with the second preferred embodiment of the present invention.

Shown in FIG. 3 is a schematic diagram of a fuel tank filler pipe neck assembly generally equivalent to the fuel tank filler pipe neck assembly 22 whose schematic diagram is illustrated in FIG. 1, but without illustration of a fuel tank 10 which otherwise equivalently connects with a fuel tank filler pipe 12 and a fuel tank fuel level sensor 16 as illustrated within the fuel tank filler pipe neck assembly whose schematic diagram is illustrated in FIG. 3. Within the fuel tank filler pipe neck assembly whose schematic diagram is illustrated in FIG. 3, in comparison with the fuel tank filler pipe neck assembly 22 whose schematic diagram is illustrated in FIG. 1, equivalent elements and structures are numbered equivalently while analogous elements and structures are numbered analogously, but denoted with a prime.

As is illustrated within the schematic diagram of FIG. 3, the liquid fuel dispensing nozzle 18 is sealed within a first chamber 30' by means of an annular sealing means 38 located at a liquid fuel dispensing nozzle entry port of a first chamber 30'. Similarly with the first preferred embodiment of the present invention, as illustrated within the schematic diagram of FIG. 1, the liquid fuel dispensing nozzle 18 is seated upon a liquid fuel dispensing nozzle seating means 24 which is further sealed with respect to a liquid fuel exit port of the first chamber 30' by means of a resilient and flexibly biased sealing means 26.

In contrast with the first preferred embodiment of the present invention, within the second preferred embodiment of the present invention, air, gas or vapor (i.e., the uncondensed make-up fluid) is supplied to a vacuum sensing port 36 of the liquid fuel dispensing nozzle 18 through means of a first chamber vent tube 42 which is generally counter-opposed to a second chamber 32' having formed thereupon an unbiased areal sealing means 40 (i.e., also specifically illustrated as a diaphragm), and wherein the second chamber 32', similarly with the second chamber 32 within the first preferred embodiment of the present invention, is in fluid communication with the fuel tank fuel level sensor 16.

Referring now to FIG. 4, there is shown a schematic diagram illustrating the results of further operation of the fuel tank filler pipe neck assembly whose schematic diagram is illustrated in FIG. 3.

Shown in FIG. 4 is a schematic diagram of a fuel tank filler pipe neck assembly otherwise equivalent to the fuel tank filler pipe neck assembly whose schematic diagram is illustrated in FIG. 3, but wherein, and analogously with the fuel tank filler pipe neck assembly whose schematic diagram is illustrated in FIG. 2, a volume of vapor or gas within the second chamber 32' has been compressed by a pressure head of a sufficiently high liquid fuel level within a fuel tank (not shown), such that the unbiased areal sealing means 40 is transformed to a pressure biased areal sealing means 40' which seals an air, gas or vapor flow through the first chamber vent tube 42 such that the vacuum sensing port 36 of the liquid fuel sensing nozzle 18 senses a vacuum and thus shuts down the liquid fuel dispensing nozzle 18.

As is understood by a person skilled in the art, the preferred embodiments of the present invention are illustrative of the present invention rather than limiting of the present invention. Revisions and modifications may be made to materials components and dimensions through which is provided in accord with the preferred embodiments of the present invention a fuel tank filler pipe neck assembly, a fuel system or a method for filling a fuel tank in accord with the present invention, further in accord with the appended claims.

What is claimed is:

1. A fuel tank filler pipe neck assembly comprising:
    a chamber having formed therein a liquid fuel dispensing nozzle entry port and a liquid fuel exit port;
    a liquid fuel dispensing nozzle seat disposed within the chamber, the liquid fuel dispensing nozzle seat being sized to accept and seal a rim of a liquid fuel dispensing nozzle introduced into the liquid fuel dispensing nozzle entry port while allowing a flow of a liquid fuel from the liquid fuel dispensing nozzle through the liquid fuel dispensing nozzle seat;
    means for resiliently and flexibly biasing the liquid fuel dispensing nozzle seat against the rim of the liquid fuel dispensing nozzle while resiliently and flexibly sealing the liquid fuel dispensing nozzle seat to the liquid fuel exit port; and
    a fuel tank level sensor comprising a hollow member an end of which terminates within the chamber, wherein the end of the fuel tank level sensor which terminates within the chamber has sealed thereover a flexible sealing means.

2. The fuel tank filler pipe neck assembly of claim 1 further comprising:
    means for introducing into the chamber a non-condensed fluid flow for operation of the liquid fuel dispensing nozzle; and
    means for attenuating within the chamber the non-condensed fluid flow for shut down of the liquid fuel dispensing nozzle, where the means for attenuating involves an expansion of the flexible sealing means.

3. The fuel tank filler pipe neck assembly of claim 1 wherein the means for resiliently and flexibly biasing the liquid fuel dispensing nozzle seat against the rim of the liquid fuel dispensing nozzle comprises a single component.

4. The fuel tank filler pipe neck assembly of claim 1 wherein the means for resiliently and flexibly biasing the liquid fuel dispensing nozzle seat against the rim of the liquid fuel dispensing nozzle comprises a multiplicity of components.

5. The fuel tank filler pipe neck assembly of claim 2 wherein the expansion of the flexible sealing means seals a diameter of the liquid fuel dispensing nozzle.

6. The fuel tank filler pipe neck assembly of claim 2 wherein the expansion of the flexible sealing means seals a vent tube an end of which also terminates within the chamber.

7. A fuel tank system comprising:
    a fuel tank having formed integral thereto a fuel tank filler pipe;
    a chamber formed within a neck of the fuel tank filler pipe distal from the fuel tank, the chamber having formed therein a liquid fuel dispensing nozzle entry port and a liquid fuel exit port;
    a liquid fuel dispensing nozzle seat disposed within the chamber, the liquid fuel dispensing nozzle seat being sized to accept and seal a rim of a liquid fuel dispensing nozzle introduced into the liquid fuel dispensing nozzle entry port while allowing a flow of a liquid fuel from the liquid fuel dispensing nozzle and through the liquid fuel dispensing nozzle seat;
    means for resiliently and flexibly biasing the liquid fuel dispensing nozzle seat against the rim of the liquid fuel dispensing nozzle while resiliently and flexibly sealing the liquid fuel dispensing nozzle seat to the liquid fuel exit port; and a fuel tank level sensor comprising a hollow member one end of which terminates within the chamber and the other end of which penetrates into the fuel tank, wherein the one end of the fuel tank level sensor which terminates within the chamber has sealed thereover a flexible sealing means.

8. The fuel tank system of claim 7 further comprising:

means for introducing into the chamber a non-condensed fluid flow for operation of the liquid fuel dispensing nozzle; and means for attenuating within the chamber the non-condensed fluid flow for shut down of the liquid fuel dispensing nozzle, where the means for attenuating involves an expansion of the flexible sealing means when filling the fuel tank with a liquid fuel.

9. The fuel tank system of claim 7 wherein the means for resiliently and flexibly biasing the liquid fuel dispensing nozzle seat against the rim of the liquid fuel dispensing nozzle comprises a single component.

10. The fuel tank system of claim 7 wherein the means for resiliently and flexibly biasing the liquid fuel dispensing nozzle seat against the rim of the liquid fuel dispensing nozzle comprises a multiplicity of components.

11. The fuel tank system of claim 8 wherein the expansion of the flexible sealing means seals a diameter of the liquid fuel dispensing nozzle.

12. The fuel tank system of claim 8 wherein the expansion of the flexible sealing means seals a vent tube an end of which also terminates within the chamber.

13. A method for refueling a fuel tank comprising:

providing a fuel tank having a fuel tank filler pipe integral thereto, the fuel tank filler pipe further having integral thereto distal from the fuel tank a chamber having a liquid fuel dispensing nozzle entry port and a liquid fuel exit port, the chamber still further having integral thereto a makeup source which provides a makeup flow of a non-condensed fluid to a vacuum sensing port of a liquid fuel dispensing nozzle when inserted into the chamber to allow for operation of the liquid fuel dispensing nozzle without shut down of the liquid fuel dispensing nozzle;

introducing into the chamber the liquid fuel dispensing nozzle having the vacuum sensing port;

dispensing within the chamber a quantity of liquid fuel from the liquid fuel dispensing nozzle into the liquid fuel exit port; and sealing, through an expansion of a flexible sealing means sealed over an end of a hollow membered fuel tank level sensor one end of which terminates within the chamber and the other end of which penetrates into the fuel tank, and incident to dispensing within the chamber the quantity of liquid fuel, the makeup source such as to attenuate the makeup flow of the non-condensed fluid to the vacuum sensing port of the liquid fuel dispensing nozzle and thus shut down the liquid fuel dispensing nozzle.

14. The method of claim 13 wherein:

a rim of the liquid fuel dispensing nozzle is seated and sealed within the chamber upon a liquid fuel dispensing nozzle seat; and the liquid fuel dispensing nozzle seat is resiliently and flexibly biased against the rim of the liquid fuel dispensing nozzle seating while further sealing the liquid fuel dispensing nozzle seat with respect to the liquid fuel exit port.

15. The method of claim 13 wherein the expansion of the flexible sealing means seals a diameter of the liquid fuel dispensing nozzle.

16. The method of claim 13 wherein the expansion of the flexible sealing means seals a vent tube an end of which also terminates within the chamber.

* * * * *